March 15, 1927.　　　N. S. HILLYARD　　　1,621,252
CONTAINER
Filed July 22, 1926
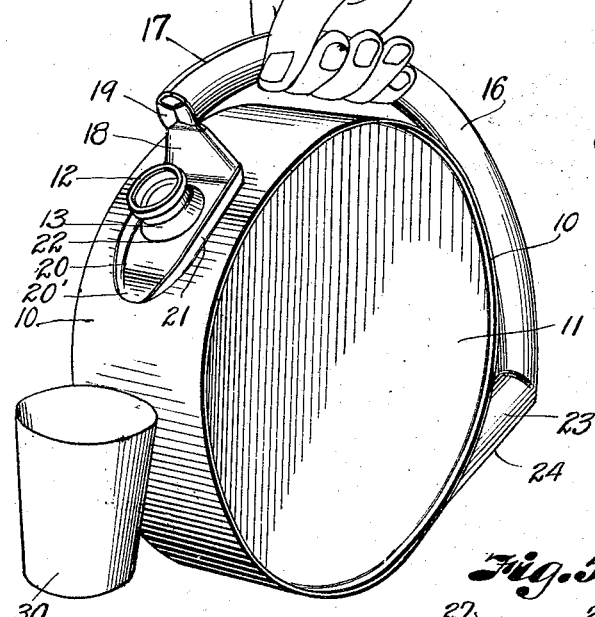
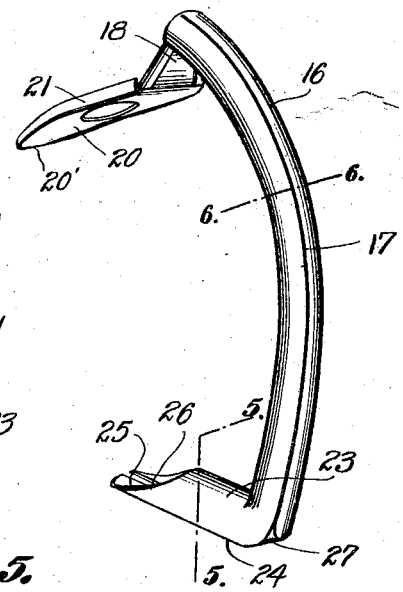
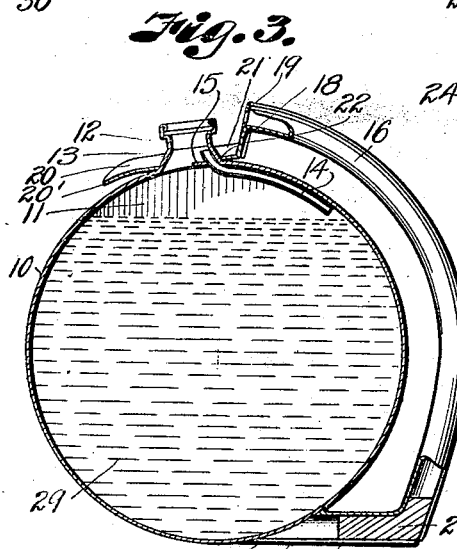
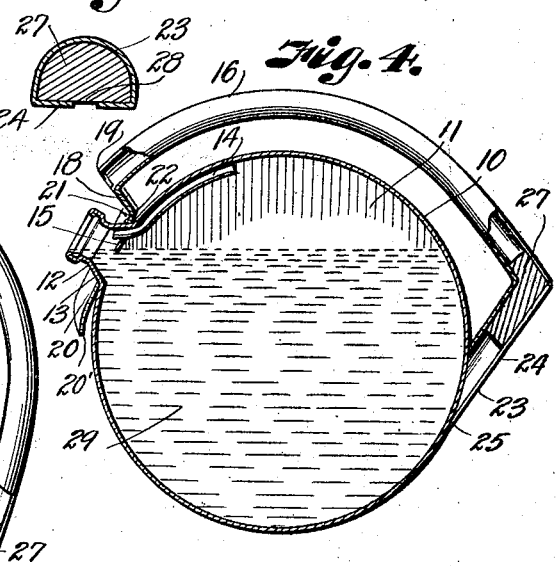
INVENTOR
*Newton S. Hillyard.*
BY
*Arthur C. Brown*
ATTORNEY Patented Mar. 15, 1927.

1,621,252

UNITED STATES PATENT OFFICE.

NEWTON S. HILLYARD, OF ST. JOSEPH, MISSOURI.

CONTAINER.

Application filed July 22, 1926. Serial No. 124,184.

My invention relates to containers and more particularly to liquid dispensing receptacles.

It is a purpose of my invention to provide a liquid dispensing receptacle with a combined handle and spout member that is so mounted as to make the manipulation of the container to dispense liquid therefrom and to return the same to normal position, easy to accomplish and furthermore to provide means associated with the handle to aid in the return of the receptacle to normal position.

It is a further purpose of my invention to provide a handle member of the above mentioned character that embraces a discharge nipple of the receptacle and is provided with a spout portion adjacent said nipple for directing a liquid flowing out of the nipple in a desired direction.

More particularly my invention comprises a tubular handle member having end portions engaging the cylindrical wall portion of a receptacle, one of said end portions being flattened and embracing the discharge nipple on the receptacle, said handle extending substantially from the discharge nipple to a point substantially diametrically opposite the same and being curved substantially concentric to the cylindrical wall portion of the receptacle so as to form an elongated handle member spaced substantially uniformly therefrom. The end portion of the handle remote from the discharge nipple is preferably provided with a weight which aids in the return of the receptacle to normal upright position.

Other objects and advantages of the invention will appear as the description of the accompanying drawings proceeds. However, I desire to have it distinctly understood that I do not intend to limit myself to the exact details shown or described, but that I intend to include as part of my invention all such obvious changes and modifications of parts as would occur to a person skilled in this art and as would fall within the scope of the claims.

In the drawings:

Fig. 1 is a perspective view of my improved receptacle in pouring position.

Fig. 2 is a perspective view of the handle member detached.

Fig. 3 is a view partly in section and partly in elevation of my improved receptacle in upright position.

Fig. 4 is a similar view thereof in pouring position.

Fig. 5 is a section taken on the line 5—5 of Fig. 2, and

Fig. 6 is a section taken on the line 6—6 of Fig. 2.

Referring in detail to the drawings:

My improved receptacle is provided with the cylindrical wall portion 10 and end walls 11. Projecting from the cylindrical wall portion 10 is a pouring nipple 12 which may be made of any desired construction but is preferably provided with a tapering wall portion 13 and with the tube 14 leading into the receptacle for the admission of air into the same together with the lip 15 for directing the liquid away from the tube 14 when the receptacle is in pouring position.

Mounted on the receptacle 10 is a handle member preferably made of sheet material and having the elongated arcuate tubular main body portion 16, the seam 17 existing in the handle member due to the fact that the same is bent out of sheet material. At one end of the handle member 16 is provided an integral downwardly extending flange portion 18 which increases in width away from the main body portion 16 of the handle. Lips 19 are also provided for substantially closing the said end portion of the handle 16. Extending from the flange portion 18 which is inclined relative to the radius of the wall portion 10 of the receptacle, is a spout forming portion 20 which has a substantially flat bottom and which terminates in a curved end portion 20' and which furthermore has the flanges 21 extending along at opposite sides thereof and terminating near the lower end of the curved portion 20', said curved downturned portion 20' tapering toward the free end thereof to thus form a pouring spout. The member 20 is soldered to the wall portion 10 at the nipple 12 at the point indicated by the numeral 22, thus securing one end of the handle member to the body portion of the receptacle.

The opposite end of the handle is offset toward the wall portion 10 as indicated at 23, said offset end portion 23 being flattened on the under side thereof as indicated at 24 in Fig. 5, the flattened projecting ends 25 provided due to the inclined cut-away portion 26 at the extreme end portion of the handle being secured to the cylindrical wall portion 10 by means of soldering to thus secure the other end of the handle in position. Mounted within the tubular portion 16 and extending into the flattened offset portion 23 is a weight 27, the same being made angular in form as evident from Fig. 4, the portion thereof within the member 16 being substantially circular in cross section and the portion thereof within the flattened extension 23 being flattened on one face thereof as indicated at 28. The weight 27 is located in such a position that the same will tend to return the receptacle to an upright position after the desired amount of liquid 29 has been poured from the same by means of the spout into any suitable receptacle 30, thus counteracting the weight of liquid in the receptacle which would otherwise make it difficult to return the receptacle to an upright position after being turned to a position such as that shown in Fig. 4, particularly when the receptacle is emptied to such an extent that the nipple 12 has to be turned to a considerable inclination from the vertical to pour liquid out of the receptacle.

It will be noted that the user of the receptacle can grasp the same at any desired point along the tubular portion 16 to tilt the same to any desired position, this making it possible to grip the handle at any point advantageous to the tilting of the receptacle to pouring position. Furthermore due to the fact that the handle extends circumferentially, there is no transverse wrist motion necessary to move the receptacle, but the same can be moved by the swinging movement of the arm of the operator, as will be evident from Fig. 1.

What I claim and desire to secure by Letters Patent is:—

1. The combination with a receptacle having a cylindrical wall portion and having a projecting discharge nipple, of a handle member secured to said cylindrical wall portion and engaging said nipple, said handle being curved substantially concentrically with said cylindrical wall portion throughout the major portion of its length and extending substantially half way around said cylindrical wall portion.

2. The combination with a receptacle having a cylindrical wall portion and having a projecting discharge nipple, of a handle member secured to said cylindrical wall portion and engaging said nipple and extending from said nipple to a point substantially diametrically opposite the same.

3. The combination with a receptacle having a cylindrical wall portion and having a projecting discharge nipple, of a handle member secured to said cylindrical wall portion and engaging said nipple and extending from said nipple to a point substantially diametrically opposite the same, and means for weighting said handle at a point spaced from said nipple.

In testimony whereof I affix my signature.

NEWTON S. HILLYARD.